(12) United States Patent
Li

(10) Patent No.: US 9,664,953 B2
(45) Date of Patent: May 30, 2017

(54) DISPLAY PANEL AND DISPLAY DEVICE

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/126,991

(22) PCT Filed: Mar. 15, 2013

(86) PCT No.: PCT/CN2013/072756
§ 371 (c)(1),
(2) Date: Dec. 17, 2013

(87) PCT Pub. No.: WO2014/000470
PCT Pub. Date: Jan. 3, 2014

(65) Prior Publication Data
US 2014/0160409 A1   Jun. 12, 2014

(30) Foreign Application Priority Data

Jun. 28, 2012 (CN) .................... 2012 2 0314046 U

(51) Int. Cl.
*G02F 1/1339* (2006.01)
*G02F 1/1341* (2006.01)
*G02F 1/1335* (2006.01)

(52) U.S. Cl.
CPC .......... *G02F 1/1339* (2013.01); *G02F 1/1341* (2013.01); *G02F 1/133512* (2013.01); *G02F 2201/501* (2013.01)

(58) Field of Classification Search
CPC .................. G02F 1/1339; G02F 2201/501
See application file for complete search history.

(56) References Cited

U.S. PATENT DOCUMENTS 6,882,399 B2 * 4/2005 Park ............... G02F 1/1339
349/106
7,724,327 B2 * 5/2010 Tai et al. .............. 349/114
(Continued)

FOREIGN PATENT DOCUMENTS

| CN | 202083863 U | 12/2011 |
|---|---|---|
| CN | 202735638 U | 2/2013 |
| JP | 2002202512 A | 7/2002 |

OTHER PUBLICATIONS

International Search Report Issued Jun. 20, 2013 Appln. No. PCT/CN2013/072756.
(Continued)

*Primary Examiner* — Dung Nguyen
*Assistant Examiner* — Shan Liu
(74) *Attorney, Agent, or Firm* — Ladas & Parry LLP

(57) ABSTRACT

According to an embodiment of the present invention, a display panel is provided, which comprises a first substrate (1) and a second substrate (2), wherein the display panel further comprises two first partitioners (6) provided between the first substrate (1) and the second substrate (2) for holding sealant (3). According to another embodiment of the present invention, a display device is also provided, which comprises the above display panel.

14 Claims, 2 Drawing Sheets

(56) References Cited

U.S. PATENT DOCUMENTS

| | | | | |
|---|---|---|---|---|
| 7,952,678 | B2* | 5/2011 | Chan | G02F 1/1339 349/153 |
| 2004/0160566 | A1* | 8/2004 | Kawabe et al. | 349/153 |
| 2005/0030471 | A1* | 2/2005 | Liou | G02F 1/1343 349/190 |
| 2007/0159094 | A1* | 7/2007 | Oh | H01L 27/3223 313/512 |
| 2007/0291216 | A1* | 12/2007 | Chan | G02F 1/1339 349/153 |
| 2010/0007842 | A1* | 1/2010 | Terao et al. | 349/153 |
| 2011/0013132 | A1* | 1/2011 | Chen | G02F 1/1339 349/155 |
| 2013/0271685 | A1* | 10/2013 | Zhao et al. | 349/43 |
| 2013/0316480 | A1* | 11/2013 | Chen | G02F 1/133512 438/30 |
| 2014/0160409 | A1 | 6/2014 | Li | |

OTHER PUBLICATIONS

International Preliminary Report on Patentability dated Dec. 31, 2014; PCT/CN2013/072756.

* cited by examiner

DISPLAY PANEL AND DISPLAY DEVICE

FIELD OF THE INVENTION

The present invention relates to a display panel and a display device.

BACKGROUND OF THE INVENTION

A conventional liquid crystal display panel comprises a color-filter substrate and a corresponding array substrate. FIG. 1 is a schematic structural diagram of a display panel of the prior art. As shown in FIG. 1, a color-filter substrate 1 comprises a black-matrix layer 4 at an inner side thereof; liquid crystal 8 is filled between the color-filter substrate 1 and an array substrate 2; and there are also spacers 9 dispersed between the color-filter substrate 1 and the array substrate 2, for supporting the thickness of a cell. After vacuum cell-assembling, if the amount of liquid crystal is excessive, it is likely that sealant 3 contacts with liquid crystal 8; sealant 3 and liquid crystal 8 will react under certain conditions, which in severe cases will affect the alignment of liquid crystal molecules and cause contamination. On the other hand, because the material of sealant is a polymer, it is vulnerable to corrosion caused by temperature and humidity outside; and moisture from outside penetrating through the sealant will cause organic material in a display region to crystallize and deform, which in turn results adverse electrochemical reaction on an organic electrode layer.

Besides, in the prior art, in an effective display region, there are spacers dispersed or supporters provided to ensure the thickness of a display panel, whereas in peripheral sealant, only silica spherical particles are added to support the thickness of the periphery of a cell. Under the effect of relatively strong electrostatic attraction during vacuum cell-assembling, the spaces and the glass substrates deforms partially after cell-assembling due to excessive pressure, which in turn causes uneven cell thickness and affects display quality of pictures.

In order to solve the problems of non-uniform display and liquid crystal contamination which are caused by sealant, the prior art usually increases a distance between a pixel region and sealant, but this will reduce the effective display area of a display region and thus affect viewing effects.

SUMMARY OF THE INVENTION

According to an embodiment of the present invention, a display panel is provided, which comprises a first substrate and a second substrate; wherein the display panel further comprises two first partitioners, which are provided between the first substrate and the second substrate for holding sealant.

According to some embodiments, the display panel can further comprise: two second partitioners, which are provided between the first substrate and the second substrate; and the two second partitioners clamp the two first partitioners, respectively.

The first substrate can be for example a color-filter substrate, and the second substrate can be for example an array substrate.

Preferably, the two first partitioners are provided on the color-filter substrate, and formed integrally with a black-matrix layer on the color-filter substrate; and the two second partitioners are provided on the array substrate, and formed integrally with an insulating layer on the array substrate.

Alternatively, preferably, the two first partitioners are provided on the array substrate, and formed integrally with an insulating layer on the array substrate; and the two second partitioners are provided on the color-filter substrate, and formed integrally with a black-matrix layer on the color-filter substrate.

Preferably, the insulating layer is formed of a transparent insulating material.

According to some embodiments, the display panel can further comprise: two second partitioners which are provided between the first substrate and the second substrate; the two second partitioners are arranged alternately with respect to the two first partitioners, so that a space for holding sealant is formed between an inner one of the first partitioners and an inner one of the second partitioners.

The first substrate can be for example a color-filter substrate, and the second substrate can be for example an array substrate.

Preferably, the two first partitioners are provide on the color-filter substrate, and formed integrally with a black-matrix layer on the color-filter substrate; and the two second partitioners are provided on the array substrate, and formed integrally with an insulating layer on the array substrate.

Alternatively, preferably, the two first partitioners are provided on the array substrate, and formed integrally with an insulating layer on the array substrate; and the two second partitioners are provided on the color-filter substrate, and formed integrally with a black-matrix layer on the color-filter substrate.

Preferably, the insulating layer is formed of a transparent insulating material.

According to an embodiment of the present invention, a display device is also provided, which comprises a display panel, the display panel comprising a first substrate and a second substrate, wherein the display panel further comprises two first partitioners, which are provided between the first substrate and the second substrate for holding sealant.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE NUMERALS

Figure 1:
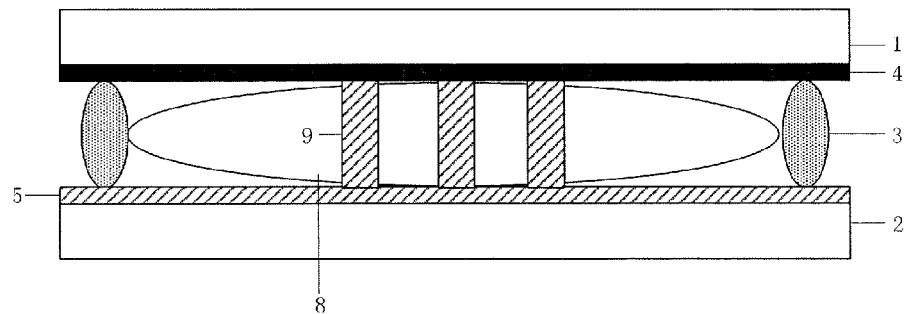
FIG. 1 is a schematic structural diagram of a display panel in the prior art.

1: color-filter substrate
2: array substrate
3: sealant
4: black-matrix layer
5: insulating layer
6: first partitioning frame
7: second partitioning frame
8: liquid crystal 9: spacer
10: black-matrix-layer partitioner
11: insulating-layer partitioner

DETAILED DESCRIPTION OF THE PREFERRED EMBODIMENTS

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A display panel in accordance with an embodiment of the present invention comprises: a first substrate and a second substrate, wherein the display panel further comprises: two first partitioners, which are provided between the first substrate and the second substrate for holding sealant. The first substrate is for example a color-filter substrate, and the second substrate is for example an array substrate. The display panel can further comprise two second partitioners, which are provided between the first substrate and the second substrate. The two second partitioners clamp the two first partitioners, or are arranged alternately with respect to the two first partitioners.

Figure 2:
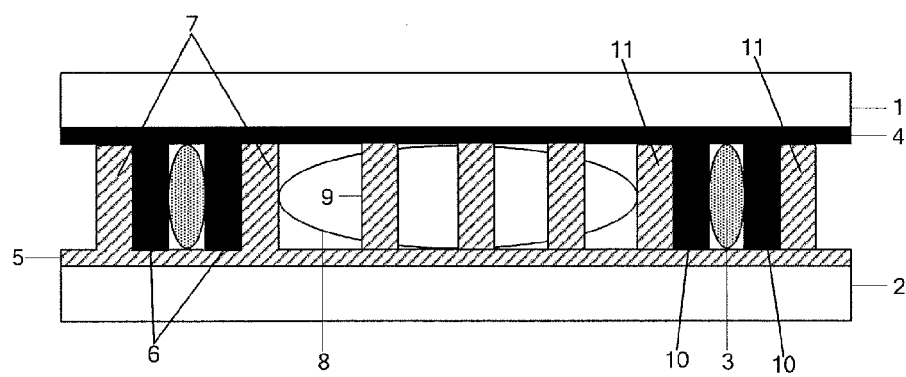
FIG. 2 is a schematic structural diagram of a display panel in accordance with an embodiment of the present invention.

FIG. 2 is a schematic structural diagram of a display panel in accordance with an embodiment of the present invention. In the embodiment shown in FIG. 2, the display panel comprises a color-filter substrate 1, an array substrate 2 and a partitioning frame. The partitioning frame comprises two parts: a first partitioning frame 6 and a second partitioning frame 7. The first partitioning frame 6 is provided on the color-filter substrate 1, and is fabricated along with a black-matrix layer 4 through one-pass patterning process by using a half-tone photomask. The second partitioning frame 7 is provided on the array substrate 2, and is fabricated along with an insulating layer 5 through one-pass patterning process by using a half-tone photomask. The first partitioning frame 6 and the second partitioning frame 7 mesh in the up-down direction, and sealant 3 is located within a cavity formed by the first partitioning frame and the black-matrix layer 4.

The first partitioning frame 6 is mainly constituted of two black-matrix-layer partitioners 10 provided between the color-filter substrate 1 and the array substrate 2. With the two black-matrix-layer partitioners 10, the sealant 3 is held within the cavity between the two black-matrix-layer partitioners 10. Although the present invention shows a structure having two partitioning frames, it is also possible to use a structure provided with one partitioning frame, for example a structure provided with only the first partitioning frame 6. With the lower edges of the two black-matrix-layer partitioners 10 abutting against the array substrate 2, the sealant 3 is securely encapsulated between the two black-matrix-layer partitioners 10, as well as between the color-filter substrate 1 and the array substrate 2. To ensure the well encapsulation of the sealant 3, the two black-matrix-layer partitioners 10 are formed integrally with the black-matrix layer 4.

Of course, in order to ensure the encapsulation effect to the sealant 3 and the display effect of the display panel, the present invention is preferably provided with the second partitioning frame 7. The second partitioning frame 7 is mainly constituted of two insulating-layer partitioners 11 provided between the color-filter substrate 1 and the array substrate 2. The two insulating-layer partitioners 11 clamp the two black-matrix-layer partitioners 10, respectively. The two insulating-layer partitioners 11 are formed integrally with the insulating layer 5.

Figure 3:
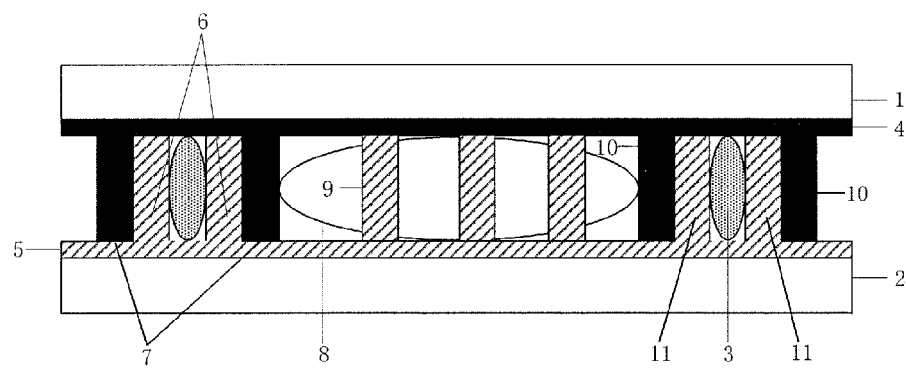
FIG. 3 is a schematic structural diagram of a display panel in accordance with another embodiment of the present invention.

FIG. 3 is a schematic structural diagram of a display panel in accordance with another embodiment of the present invention. As shown in FIG. 3, the display panel comprises a color-filter substrate 1, an array substrate 2 and a partitioning frame. The partitioning frame comprises two parts: a first partitioning frame 6 and a second partitioning frame 7. In FIG. 3, the second partitioning frame 7 is provided on the color-filter substrate 1, and is fabricated along with a black-matrix layer 4 through one-time patterning process by using a half-tone photomask. The first partitioning frame 6 is provided on the array substrate 2, and is fabricated along with an insulating layer 5 through one-time patterning process by using a half-tone photomask. The first partitioning frame 6 and the second partitioning frame 7 mesh in the up-down direction, and sealant 3 is located within a cavity formed by the second partitioning frame 7 and the insulating layer 5.

The second partitioning frame 7 is mainly constituted of two insulating-layer partitioners 11 provided between the color-filter substrate 1 and the array substrate 2. The sealant 3 is held within the cavity between the two insulating-layer partitioners 11. The two insulating-layer partitioners 11 are formed integrally with the insulating layer 5. Although the present invention shows a structure having two partitioning frames, it is also possible to use a structure provided with one partitioning frame, for example a structure provided with only the second partitioning frame 7. With the upper edges of the two insulating-layer partitioners 11 abutting against the color-filter substrate 1, the sealant 3 is securely encapsulated between the two insulating-layer partitioners 11, as well as between the color-filter substrate 1 and the array substrate 2. To ensure the well encapsulation of the sealant 3, the two insulating-layer partitioners 11 are formed integrally with the insulating layer 5.

The first partitioning frame 6 is mainly constituted of two black-matrix-layer partitioners 10 provided between the color-filter substrate 1 and the array substrate 2; and the two black-matrix-layer partitioners 10 are clamped between the two insulating-layer partitioners 11, respectively.

Figure 4:
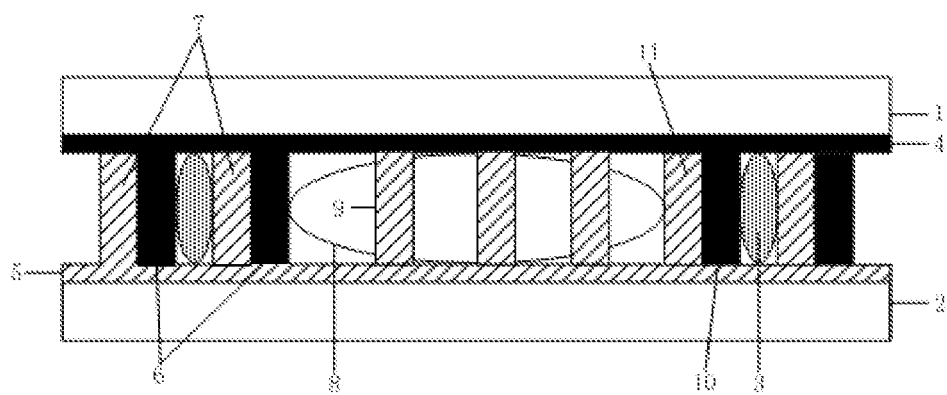
FIG. 4 is a schematic structural diagram of a display panel in accordance with a further embodiment of the present invention.

Although in the embodiments shown in FIG. 2 and FIG. 3, the two second partitioners 7 clamp the two first partitioners 6, it will be understood by the skilled in the art that, in other embodiments of the present invention, the two second partitioners 7 can be arranged alternately with respect to the two first partitioners 6, so that a space for holding sealant is formed between the inner first partitioner 6 and the inner second partitioner 7, as shown in FIG. 4. Other features as described above with reference to FIG. 2 and FIG. 3 can be used alone or in combination in the embodiments where the first partitioners and the second partitioners are arranged alternately.

Below is a brief introduction of a method of manufacturing the structure of the present invention:

Step 1, forming patterns for a common electrode layer and a color-filter layer on a substrate; then forming patterns for a black-matrix layer and a first partitioning frame (or a second partitioning frame) by using a half-tone mask through one-pass patterning process; and thus forming an array substrate;

Step 2, forming patterns for a gate layer, a gate insulating layer, an active layer and a source-drain layer on a substrate;

then forming patterns for an insulating layer and a second partitioning frame (or a first partitioning frame) by using a half-tone mask through one-pass patterning process; and thus forming a color-filter substrate;

Step 3, applying sealant into a cavity formed by the first partitioning frame (or the second partitioning frame) and the black-matrix layer, or into a cavity formed by the second partitioning frame (or the first partitioning frame) and the insulating layer; and then forming a display panel through vacuum drop filling of liquid crystal and cell-assembling.

Spacers 3 are preferably formed simultaneously with the insulating layer and the second partitioning frame (or the first partitioning frame).

In addition, before the Step 3, the method can further comprise a step of: forming an alignment layer at inner sides of the array substrate and the color-filter substrate, with the alignment layer being provided on at least one of the black-matrix layer and the insulating layer.

In the display panel provided according to the embodiment of the present invention, by providing partitioners for sealant, and utilizing the partitioners to securely encapsulate the sealant between the color-filter substrate and the array substrate, so that the sealant will not contact the liquid crystal, the liquid crystal is prevented from being contaminated by external environment and the sealant; moreover, the problems that lines of sealant are uneven, peeled or broken during cure of sealant are solved, so that the cure of sealant is more uniform and regular.

The partitioning frame (the first partitioners or the combination of the first partitioners and the second partitioners) in the display panel also serves to support the color-filter substrate and the array substrate, thereby stabilizing the thickness of the periphery of the cell. By providing duplex partitioners with one being formed integrally with the black-matrix layer, the display panel is effectively prevented from light-leakage around its periphery. The gap-free up-and-down mesh between the duplex partitioners improves the structural strength of the display panel in a horizontal direction.

According to an embodiment of the present invention, a display device is also provided, which comprises a display panel. The display panel comprises a first substrate, a second substrate, and a partitioning frame as described in the above embodiments. The display device can be: a liquid crystal panel, an electronic paper, an OLED panel, a liquid crystal TV, a liquid crystal display, a digital photo frame, a mobile phone, a tablet PC, or any product or a component which has a display function.

The display device of the present invention is particularly a liquid crystal display. The display panel is particularly a liquid crystal panel.

For the display device of the present invention, of which the display panel being provided as a structure having the above-described partitioning frame, the display panel is effectively prevented from light-leakage around its periphery; and the gap-free up-and-down mesh between the duplex partitioners improves the structural strength of the display panel in a horizontal direction and ensures the display effect.

The above described are merely preferred embodiments of the present invention, which are not intended to limit the scope of the invention.

What is claimed is:

1. A display panel, comprising:
a first substrate; and
a second substrate;
wherein the display panel further comprises: two first partitioners, which are provided between the first substrate and the second substrate and used for holding sealant,
wherein the display panel further comprises: two second partitioners, which are provided between the first substrate and the second substrate; and the two second partitioners clamp the two first partitioners, respectively,
wherein heights of the first partitioners and the second partitioners are the same as a thickness of a display medium layer between the first substrate and the second substrate,
the sealant is only disposed between the first partitioners;
both directly contacting lengths along the thickness direction of the display medium layer between each of the second partitioners and one of the first partitioners next to it are equal to the thickness of the display medium layer, and
wherein said first partitioners and second partitioners are formed of different materials, said first partitioners being formed as one of a black-matrix layer and an insulating layer, and said second partitioners being formed as the other one of the black-matrix layer and the insulating layer.

2. The display panel according to claim 1, wherein the first substrate is a color-filter substrate, and the second substrate is an array substrate.

3. The display panel according to claim 2, wherein the two first partitioners are provided on the color-filter substrate, and formed integrally with a black-matrix layer on the color-filter substrate; and
the two second partitioners are provided on the array substrate, and formed integrally with an insulating layer on the array substrate.

4. The display panel according to claim 3, wherein the insulating layer is formed of a transparent insulating material.

5. The display panel according to claim 2, wherein the two first partitioners are provided on the array substrate, and formed integrally with an insulating layer on the array substrate; and
the two second partitioners are provided on the color-filter substrate, and formed integrally with a black-matrix layer on the color-filter substrate.

6. The display panel according to claim 5, wherein the insulating layer is formed of a transparent insulating material.

7. A display device, comprising the display panel according to claim 6.

8. A display device, comprising the display panel according to claim 1.

9. A display panel, comprising:
a first substrate; and
a second substrate;
wherein the display panel further comprises: two first partitioners, which are provided between the first substrate and the second substrate and used for holding sealant,
wherein the display panel further comprises: two second partitioners which are provided between the first substrate and the second substrate; the two second partitioners are arranged alternately with respect to the two first partitioners, so that a space for holding sealant is formed between an inner one of the first partitioners and an inner one of the second partitioners, wherein heights of the first partitioners and the second partitioners are the same as a thickness of a display medium layer between the first substrate and the second substrate, the sealant is only disposed between the first partitioners;

both directly contacting lengths along the thickness direction of the display medium layer between the inner one of the first partitioners and an outer one of the second partitioners and between the inner one of the second partitioners and an outer one of the first partitioners are equal to the thickness of the display medium layer, and wherein said first partitioners and second partitioners are formed of different materials, said first partitioners being formed as one of a black-matrix layer and an insulating layer, and said second partitioners being formed as the other one of the black-matrix layer and the insulating layer.

10. The display panel according to claim 9, wherein the first substrate is a color-filter substrate, and the second substrate is an array substrate.

11. The display panel according to claim 10, wherein the two first partitioners are provided on the color-filter substrate, and formed integrally with a black-matrix layer on the color-filter substrate; and the two second partitioners are provided on the array substrate, and formed integrally with an insulating layer on the array substrate.

12. The display panel according to claim 11, wherein the insulating layer is formed of a transparent insulating material.

13. The display panel according to claim 10, wherein the two first partitioners are provided on the array substrate, and formed integrally with an insulating layer on the array substrate; and the two second partitioners are provided on the color-filter substrate, and formed integrally with a black-matrix layer on the color-filter substrate.

14. The display panel according to claim 13, wherein the insulating layer is formed of a transparent insulating material.

* * * * *